(12) United States Patent
Lee

(10) Patent No.: US 10,560,713 B2
(45) Date of Patent: Feb. 11, 2020

(54) METHOD AND APPARATUS FOR MOTION VECTOR REFINEMENT-BASED INTER PREDICTION IN IMAGE CODING SYSTEM

(71) Applicant: LG Electronics Inc., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 15/762,965

(22) PCT Filed: Jan. 22, 2016

(86) PCT No.: PCT/KR2016/000746
§ 371 (c)(1),
(2) Date: Mar. 23, 2018

(87) PCT Pub. No.: WO2017/052000
PCT Pub. Date: Mar. 30, 2017

(65) Prior Publication Data
US 2019/0089974 A1    Mar. 21, 2019

Related U.S. Application Data

(60) Provisional application No. 62/232,411, filed on Sep. 24, 2015.

(51) Int. Cl.
*H04N 19/513*    (2014.01)
*H04N 19/523*    (2014.01)
(Continued)

(52) U.S. Cl.
CPC ......... *H04N 19/513* (2014.11); *H04N 19/176* (2014.11); *H04N 19/52* (2014.11); *H04N 19/523* (2014.11)

(58) Field of Classification Search
None
See application file for complete search history.

(56) References Cited

U.S. PATENT DOCUMENTS

| | | |
|---|---|---|
| 2006/0198445 A1 | 9/2006 | Li et al. |
| 2013/0003849 A1* | 1/2013 | Chien .................... H04N 19/13 |
| | | 375/240.16 |

(Continued)

FOREIGN PATENT DOCUMENTS

| | | |
|---|---|---|
| KR | 10-2014-0074953 | 9/2014 |
| WO | 2013/069976 | 5/2013 |

*Primary Examiner* — Mohammed Jebari
(74) *Attorney, Agent, or Firm* — Fish & Richardson P.C.

(57) ABSTRACT

An inter prediction method performed by a decoding apparatus includes: receiving information on a motion vector difference (MVD) in units of integer samples; deriving a first motion vector predictor (MVP) in units of fraction samples on the basis of neighboring blocks of a current block; deriving a second MVP in units of integer samples on the basis of the first MVP; determining a first motion vector (MV) in units of integer samples for the current block on the basis of the second MVP and the MVD; determining a second MV in units of fraction samples for the current block on the basis of the first MVP and the first MV; and generating a prediction sample for the current block on the basis of the second MV. The present invention is capable of increasing the accuracy of the MV while reducing the amount of data allocated to the MVD.

19 Claims, 7 Drawing Sheets

(51) Int. Cl.
*H04N 19/52* (2014.01)
*H04N 19/176* (2014.01)

(56) References Cited

U.S. PATENT DOCUMENTS

| | | | |
|---|---|---|---|
| 2013/0039423 A1* | 2/2013 | Helle | H04N 19/197 375/240.13 |
| 2014/0241434 A1 | 8/2014 | Lin et al. | |
| 2015/0195562 A1 | 7/2015 | Li et al. | |
| 2016/0337662 A1* | 11/2016 | Pang | H04N 19/176 |

* cited by examiner

FIG. 4

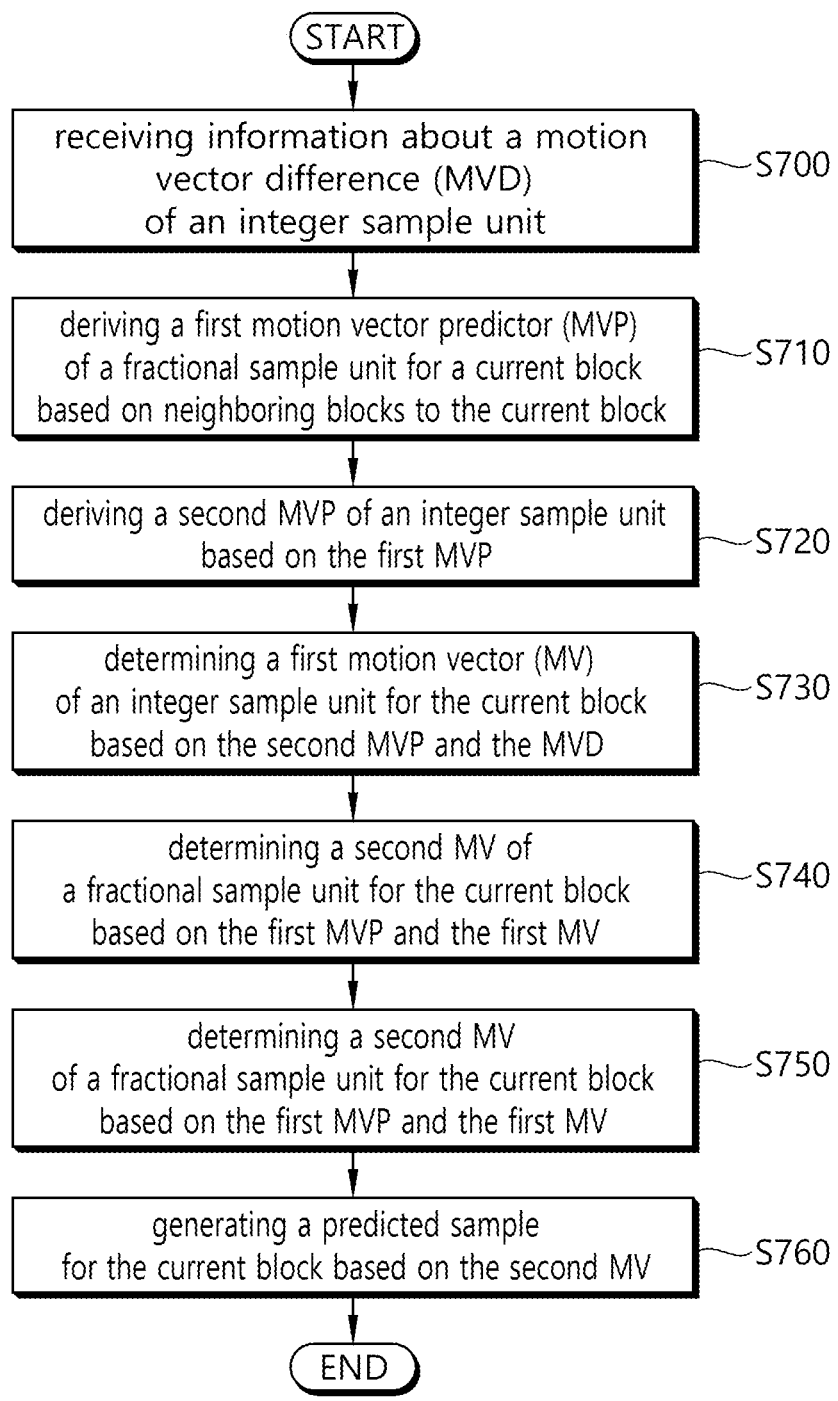

METHOD AND APPARATUS FOR MOTION VECTOR REFINEMENT-BASED INTER PREDICTION IN IMAGE CODING SYSTEM

CROSS-REFERENCE TO RELATED APPLICATIONS

This application is a National Stage application under 35 U.S.C. § 371 of International Application No. PCT/KR2016/000746, filed Jan. 22, 2016, which claims the benefit of U.S. Application No. 62/232,411, filed on Sep. 24, 2015. The disclosures of the prior applications are incorporated by reference in their entirety.

BACKGROUND

Field of the Invention

The present invention relates to an image coding technique, and more particularly, to a motion vector refinement-based inter prediction method and device in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present invention provides a method and a device for enhancing image coding efficiency.

Another technical purpose of the present invention is to provide a method and device for improving the efficiency of inter prediction.

Another technical purpose of the present invention is to provide a method and device for deriving an efficient motion vector (MV) based on AMVR (adaptive motion vector resolution).

Another technical purpose of the present invention is to provide a method and device for deriving a more accurate MV while reducing side information.

In one embodiment of the present invention, there is provided an inter prediction method performed by a decoder. The method includes receiving information about a motion vector difference (MVD) of an integer sample unit; deriving a first motion vector predictor (MVP) of a fractional sample unit for a current block based on neighboring blocks to the current block; deriving a second MVP of an integer sample unit based on the first MVP; determining a first motion vector (MV) of an integer sample unit for the current block based on the second MVP and the MVD; determining a second MV of a fractional sample unit for the current block based on the first MVP and the first MV; and generating a predicted sample for the current block based on the second MV.

In another embodiment of the present invention, there is provided a decoder configured for preforming an inter prediction method. The decoder includes a decoding module configured for receiving information about a motion vector difference (MVD) of an integer sample unit; and a prediction module configured for: deriving a first motion vector predictor (MVP) of a fractional sample unit for a current block based on neighboring blocks to the current block; deriving a second MVP of an integer sample unit based on the first MVP; determining a first motion vector (MV) of an integer sample unit for the current block based on the second MVP and the MVD; determining a second MV of a fractional sample unit for the current block based on the first MVP and the first MV; and generating a predicted sample for the current block based on the second MV.

In still another embodiment of the present invention, there is provided a video encoding method performed by an encoder. The method includes determining a first motion vector (MV) of an integer sample unit based on motion estimation; deriving a first motion vector predictor (MVP) of a fractional sample unit for a current block based on neighboring blocks to the current block; deriving a second MVP of an integer sample unit based on the first MVP; calculating a motion vector difference (MVD) based on the first MV and the second MVP; encoding and transmitting the MVD; determining a second MV of a fractional sample unit for the current block based on the first MV and the first MVP; generating a predicted sample for the current block based on the second MV; generating a reconstructed picture based on the predicted sample and a residual sample for the current block; and storing the reconstruct picture in a memory.

In still yet another embodiment of the present invention, there is provided a video encoder. The encoder includes a prediction module configured for determining a first motion vector (MV) of an integer sample unit based on motion estimation; deriving a first motion vector predictor (MVP) of a fractional sample unit for a current block based on neighboring blocks to the current block; deriving a second MVP of an integer sample unit based on the first MVP; calculating a motion vector difference (MVD) based on the first MV and the second MVP; determining a second MV of a fractional sample unit for the current block based on the first MV and the first MVP; and generating a predicted sample for the current block based on the second MV; an encoding module configured for encoding and transmitting the MVD; an adder configured for generating a reconstructed picture based on the predicted sample and a residual sample for the current block; and a memory configured for storing the reconstruct picture therein.

According to the present invention, the accuracy of motion vector (MV) can be increased while reducing the amount of data allocated to motion vector difference (MVD). Also, according to the present invention, the efficiency of inter prediction can be improved and the overall coding efficiency can be increased.

BRIEF DESCRIPTION OF THE DRAWINGS

FIG. 4 outlines the positions of the integer and fractional samples for ¼ fractional sample-based interpolation in inter prediction.

FIG. 7 schematically shows an example of the inter prediction method according to the present invention.

DETAILED DESCRIPTION

Figure 1:
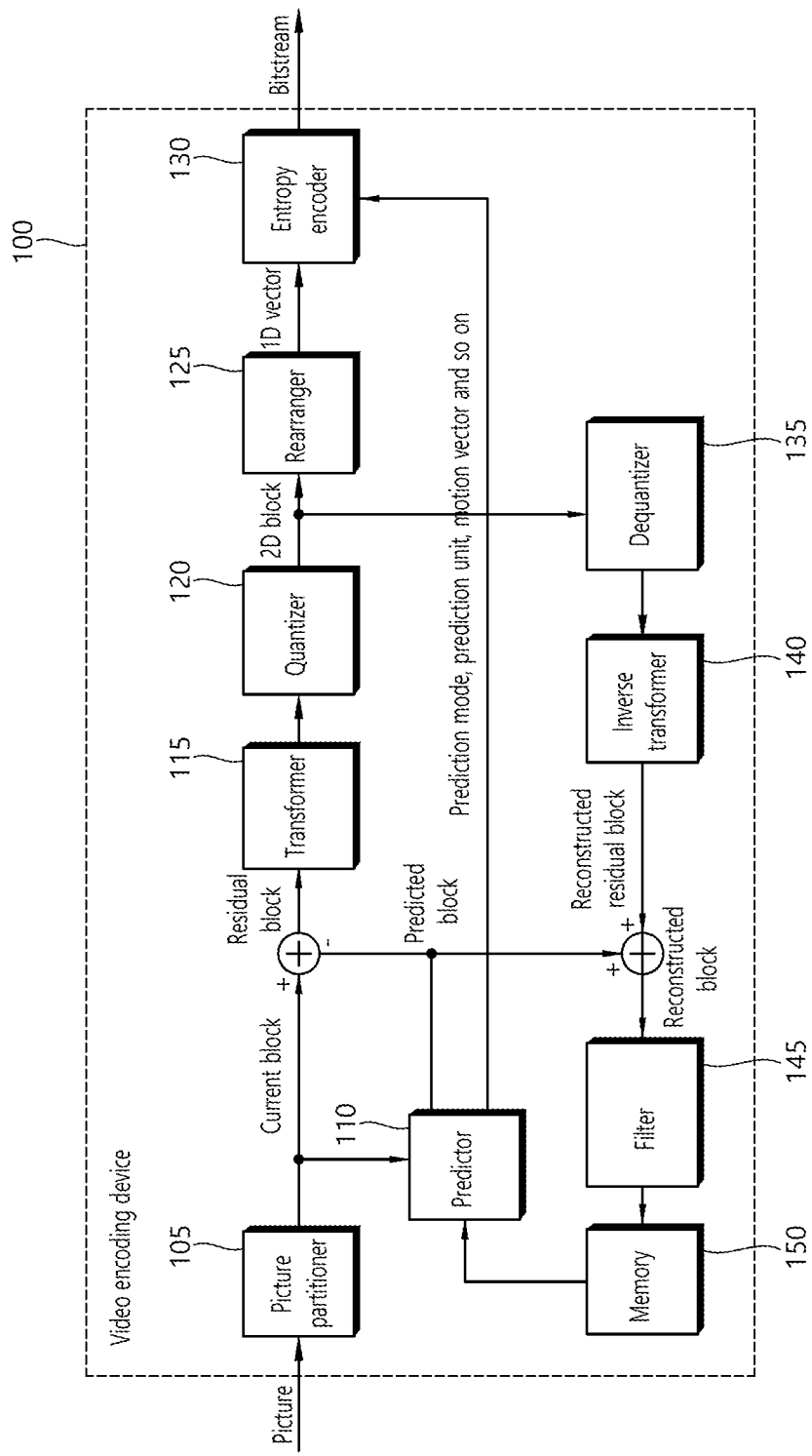
FIG. 1 is a block diagram schematically illustrating a video encoding device according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter prediction unit that performs an inter prediction process and an intra prediction unit that performs an intra prediction process, as will be described later. The predictor 110 performs a prediction process on the processing units of a picture divided by the picture dividing module 105 to create a prediction block including a predicted samples or a predicted samples array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Further, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, if necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
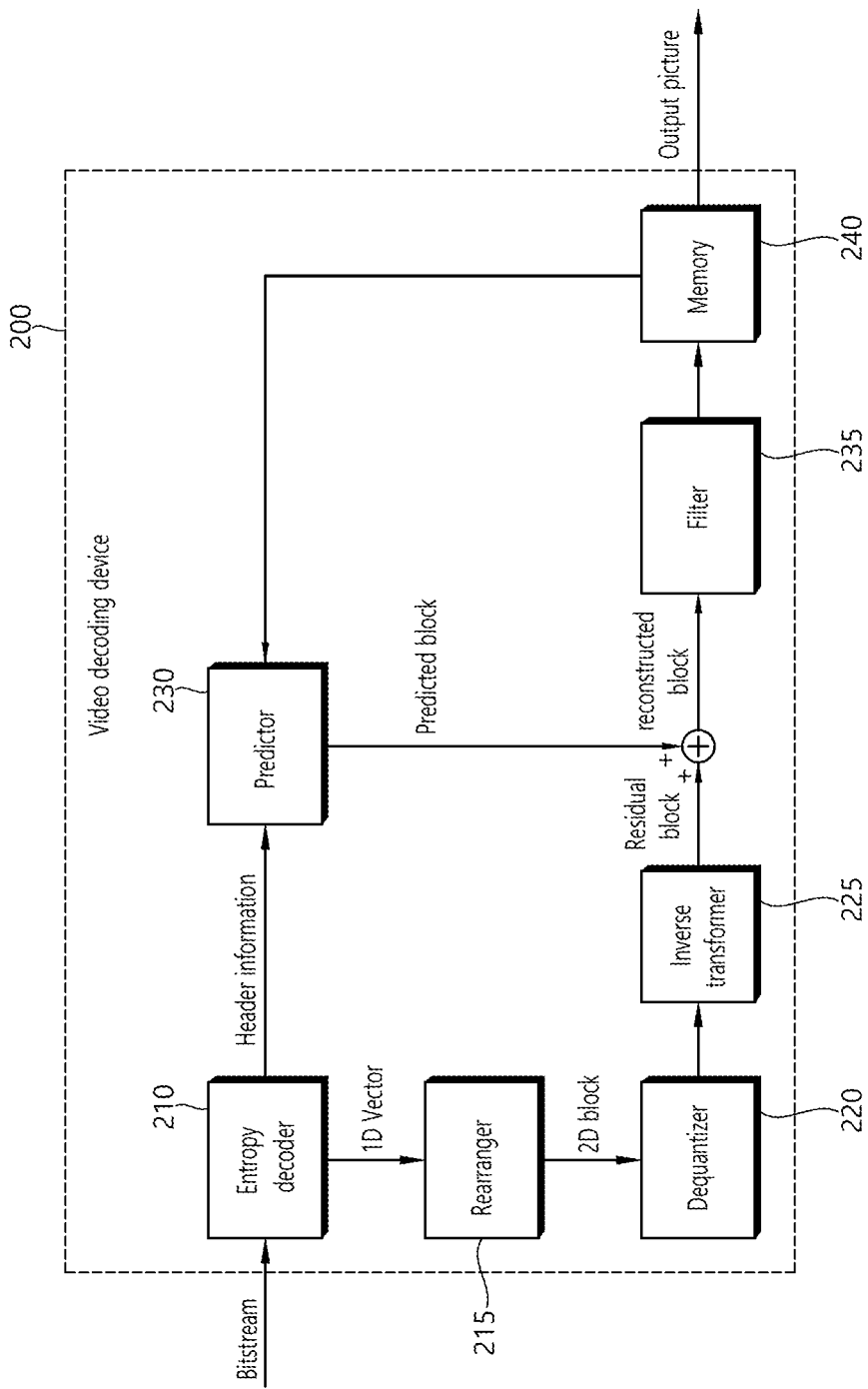
FIG. 2 is a block diagram schematically illustrating a video decoding device according to an embodiment of the invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded on the basis of the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Further, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 on the basis of the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed on the basis of a transfer unit or a partition unit of a picture determined by the video encoding device. The transformer of the video encoding device may selectively perform the DCT and/or DST depending on plural information pieces such as the prediction method, the size of a current block, and the prediction direction, and the inverse transformer 225 of the video decoding device may perform the inverse transform on the basis of the transform information on the transform performed by the transformer of the video encoding device.

The predictor 230 generates a prediction block including predicted samples or predicted samples array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Further, the encoding device may transmit a reference picture index indicating a reference picture to the decoding device.

The decoding device may predict the motion vector of the current block using the motion information of the neighboring block and derive the motion vector of the current block using the residual received from the encoding device. The decoding device may generate predicted block for the current block based on the derived motion vector and the reference picture index information received from the encoding device.

In another example, when the merge mode is applied, the encoder and decoder may generate a merge candidate list using the motion information of the reconstructed neighboring blocks and/or the motion information of the Col block. That is, if there is motion information of reconstructed neighboring blocks and/or Col blocks, the encoder and decoder may use the motion information as a merge candidate for the current block.

The encoder may select a merge candidate that may provide optimal encoding efficiency among the merge candidates included in the merge candidate list as motion information for the current block. In this connection, a merge index indicating the selected merge candidate may be included in the bitstream and transmitted to the decoder. The decoder may select one of the merge candidates included in the merge candidate list using the transmitted merge index. The decoder may determine the selected merge candidate as motion information of the current block. Therefore, when the merge mode is applied, motion information corresponding to reconstructed neighboring blocks and/or Col blocks may be used as motion information of the current block. The decoder may reconstruct the current block by adding the predicted block and the residual transmitted from the encoder.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoding device in addition to information indicating which block's motion information to use as the motion information for the current block.

The encoder and decoder may generate a predicted block of the current block by performing motion compensation on the current block based on the derived motion information. In this connection, the predicted block may be a motion compensated block generated by performing motion compensation on the current block. Also, a plurality of motion compensated blocks may constitute one motion compensated image.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed samples array as described above; the predicted block includes a predicted samples or a predicted samples array; the residual block may include a residual samples or a residual samples array. Therefore, the reconstructed samples or the reconstructed samples array can be considered to be generated by combining the corresponding predicted samples or predicted samples array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parsor not shown in the drawing that parses information related to the encoded images included in a bitstream. The parsor may include the entropy decoder 210, and may be included in the entropy decoder 210. Such a parsor may also be implemented as an element of the decoding module.

Figure 3:
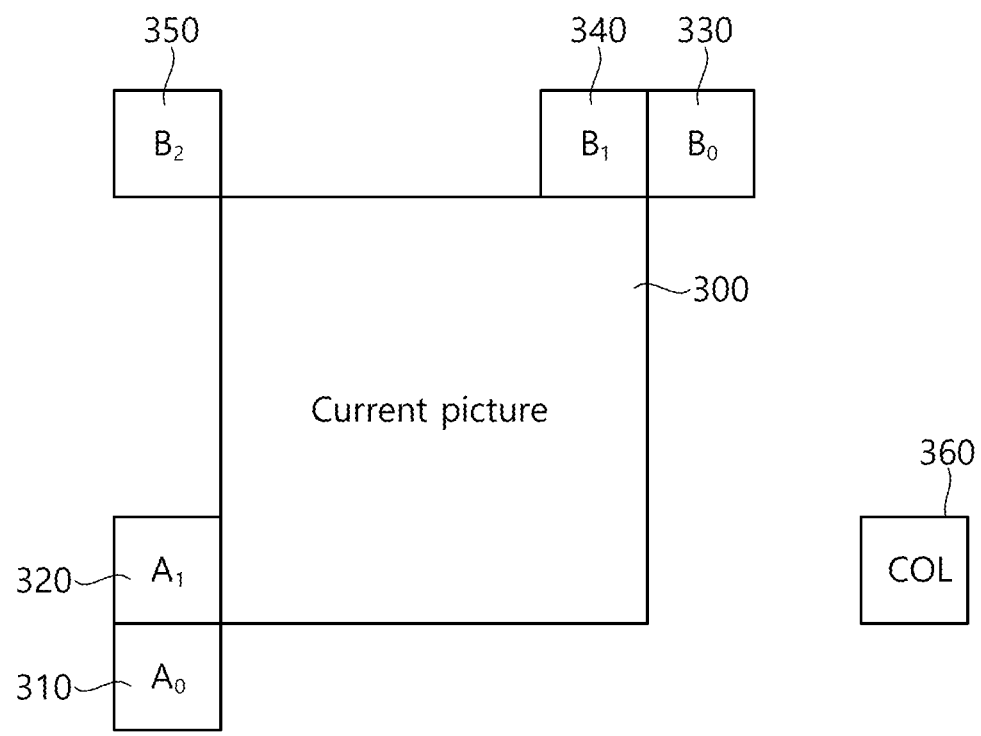
FIG. 3 schematically illustrates an example of a candidate block that may be used when inter prediction is performed on a current block.

FIG. 3 schematically illustrates an example of a candidate block that may be used when inter prediction is performed on a current block. In this connection, the current block may be a predicted block.

The prediction module of the encoder and decoder may use as candidate blocks, reconstructed neighboring blocks at predetermined positions around the current block 300. For example, in the example of FIG. 3, two blocks A0 310 and A1 320 located on the left side of the current block and three blocks B0 330, B1 340, and B2 350 above the current block may be selected as spatial candidate blocks. In this connection, the block A0 310 may be referred to as a lower left neighboring block, the block A1 320 may be referred to as a left neighboring block. The block B0 330 may be referred to as the upper right neighboring block. The block B1 340 is referred to as an upper neighboring block. The block B2 350 may be referred to as an upper left neighboring block.

Further, the above-mentioned Col block 360 may be used as a candidate block as a temporal candidate block in addition to the spatially adjacent blocks. Col block 360 may be referred to as a ColPb Col predicted block. The Col block is a block corresponding to the current block in a collocated picture (Col picture) which is one of the reconstructed reference pictures. The Col block may be a block existing in a predetermined relative position (a position arithmetically shifted according to certain criteria from the center lower-right sample position or the lower-right neighboring sample of the block existing at the same position as the current block in the Col picture).

Specifically, in the AMVP mode, an optimal MVP for the current block is selected from MVP candidate lists including motion vector predictor (MVP) candidates derived from candidate blocks. In this case, the encoder derives an optimal MVP from the MVP candidate list based on MV of the current block derived by performing motion estimation. The encoder subtracts the MVP from the MV to calculate the MVD. The encoder encodes MVP index information indicating an MVP for the current block among MVP candidates included in the MVP candidate list, and MVD information indicating an x axis value and a y axis value of the MVD, and transmits the encoded information to the decoder via the bit stream.

The decoder may derive an MVP for a current block from the MVP candidate list based on MVP index information and MVD information transmitted from an encoder. The decoder may derive MV of the current block by adding MVD to the derived MVP. Then, the decoder derives a reference block on a reference picture based on the MV of the current block. The decoder may use the reference block as a predicted block for the current block. That is, the decoder may use the samples in the reference block as predicted samples for the current block.

The motion vector (the difference between the current block and the reference block) may have a sample resolution of less than or equal to an integer unit. For example, the motion vector may have a ¼ sample resolution for the luma component. Therefore, a ¼ unit fractional sample is generated from an integer sample or a full sample by interpolation on a reference picture. Then, a reference block is selected from the region containing the fractional sample. This allows the reference block that is more similar to the current block to be specified.

A fractional sample of less than or equal to the integer unit may be generated using an interpolation filter based on the integer sample. As described above, in the case of the luma component sample, the resolution of the motion vector is a ¼ fractional sample. The encoder and decoder may generate sample information having a unit equal to or smaller than the integer on a ¼ sample basis via the interpolation. To perform interpolation on the luma sample, an 8-taps interpolation filter with different filter coefficients may be used.

Figure 4:
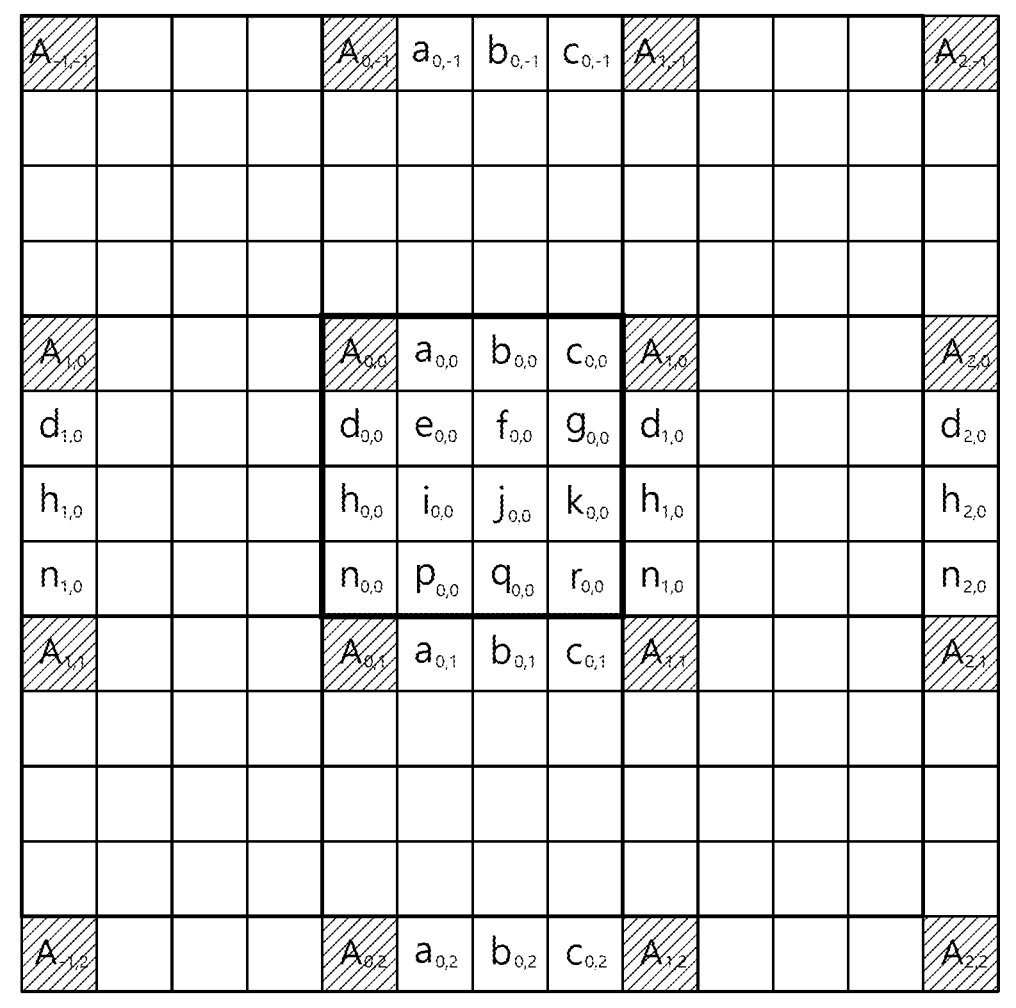

FIG. 4 is a schematic representation of the positions of the integer and fractional samples for interpolation on a ¼ fractional sample basis in the inter prediction. Among the positions of the samples shown in FIG. 4, the hatched or upper-case position corresponds to an integer sample, while a non-hatched or lower-case position corresponds to a fractional sample.

Table 1 below is an example of filter coefficients according to sample position. For example, the filter coefficients may be applied to a sample of luma components.

TABLE 1

| sample position | filter coefficients |
| --- | --- |
| ¼ | {−1, 4, −10, 58, 17, −5, 1, 0} |
| 2/4 | {−1, 4, −11, 40, 40, −11, 4, −1} |
| ¾ | {0, 1, −5, 17, 58, −10, 4, −1} |

For example, the fractional samples of FIG. 4 may be derived by applying an 8-taps filter based on the filter coefficients.

When the MV is derived on the fraction sample basis, the inter prediction performance is increased and the amount of data allocated to the residual signal is reduced. However, in this case, MVD should also be indicated on a fraction sample basis. Thus, the amount of data allocated to the MVD increases.

Meanwhile, by adjusting the resolution of the motion vector adaptively, the coding efficiency can be increased. This may be referred to as AMVR (adaptive motion vector resolution).

Figure 5B:
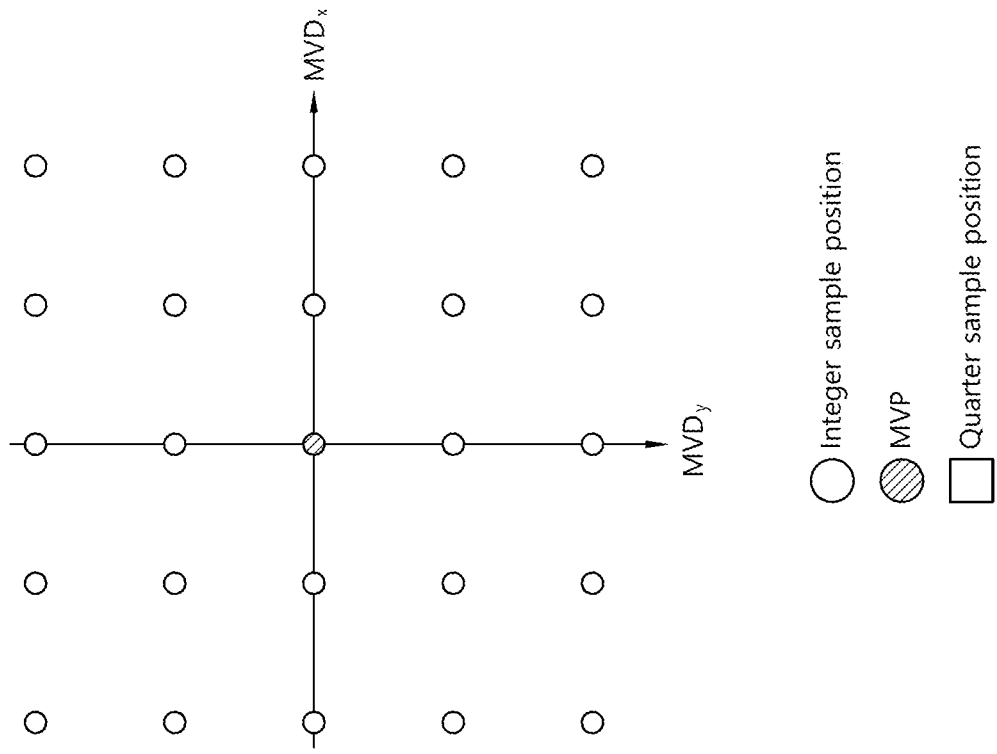
FIGS. 5A and 5B show an exemplary method for deriving a motion vector according to the present invention.
Figure 5A:
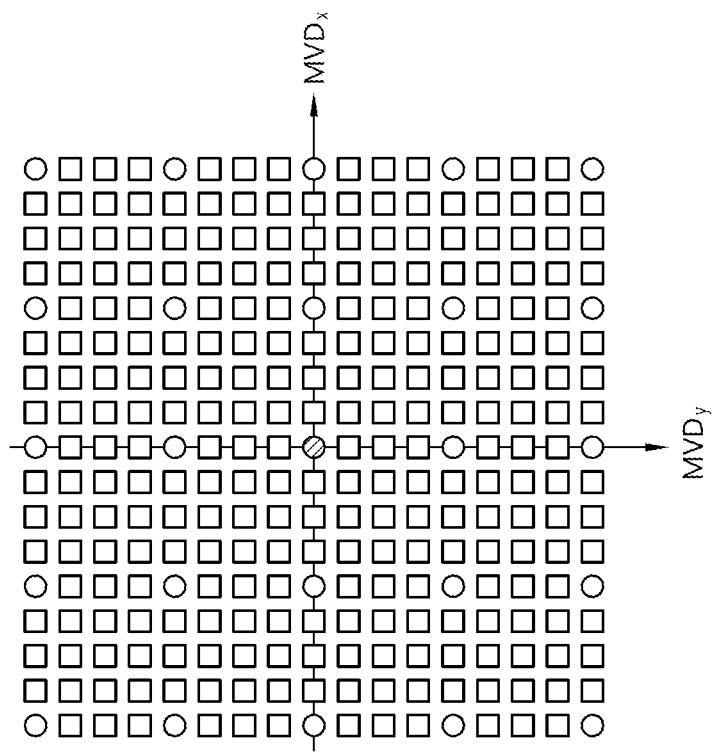

FIGS. 5A and 5B illustrate a method for deriving a motion vector according to the present invention.

Referring to FIGS. 5A and 5B, the encoder and decoder may consider the fractional sample unit based MV and the integer sample unit based MV to determine the optimal coding mode. FIG. 5A is an example of deriving an MV on a fractional sample basis, and FIG. 5B is an example of deriving an MV on an integer sample basis. In determining the MV on the fractional sample basis, the accuracy of the MV may be increased and the amount of data allocated to the residual signal may be reduced. On the other hand, in case of determining the MV on the integer sample basis, the accuracy of the MV may be lowered compared to the case of determining the MV on the fractional sample basis, but the amount of side information for the MVD may be reduced compared to the case of determining the MV on the fractional sample basis. In other words, according to AMVR, MV is represented on the integer sample basis, so that bit rate or data amount of MVD which is information to be coded and transmitted can be reduced.

As in the FIG. 5A case, when, on a fractional sample basis, the mv is derived, the derived mv, mvp, and mvd as obtained on the fractional sample basis are used as $mv_{coding}$, $mvp_{coding}$, and $mvd_{coding}$ for the actual coding, as shown in the following table:

TABLE 2

$mv_{coding} = mv$
$mvp_{coding} = mvp$
$mvd_{coding} = mvd$
$mvd = mv - mvp$

When deriving the MV on a fractional sample basis, there is an advantage of obtaining a more accurate MV, but the amount of side information required for MVD expression increases accordingly. Therefore, the MV accuracy and the side information amount are in a trade-off relationship.

When deriving the MV on an integer sample basis as in the case of FIG. 5B, r(MV) and r(MVP) corresponding to rounded integer sample values are used as $MV_{coding}$ and $MVP_{coding}$ for actual coding, as shown in the following table. In this connection, rounding may include rounding up and rounding down.

TABLE 3

$mv_{coding} = r(mv)$
$mvp_{coding} = r(mvp)$
$mvd_{coding} = mvd_{AMVR}$
$mvd_{AMVR} = r(mv) - r(mvp)$ In this case, $mvd_{AMVR}$ which is a difference value between r(mv) and r(mvp) is encoded and transmitted. Therefore, since $mvd_{AMVR}$ as encoded and transmitted has an integer sample unit, the $mvd_{AMVR}$ may be encoded using fewer bits. However, in this case, since r(mv) rather than mv is used as $mv_{coding}$ for actual coding, there is a problem that the encoding accuracy is poor.

When AMVR is applied, and if the accuracy is obtained as in the case of determining the MV on a fractional sample basis while the amount of the side information is maintained as in the case of determining the MV on an integer sample basis, coding efficiency can be further improved. To this end, according to one embodiment of the present invention, motion vector refinement (MVR) may be performed using neighboring MVP information to increase the accuracy of MV implicitly.

According to the present invention, at the time of performing AMVR, MV used in actual coding, that is, $mv_{coding}$, may be defined as $mv_{MVR}$ as shown in Table 4 below. The $mv_{MVR}$ may be calculated as Equation 1 below.

TABLE 4

$mv_{coding} = mv_{MVR}$
$mvp_{coding} = r\,(mvp)$
$mvd_{coding} = mvd_{AMVR}$
$r\,(mv) = mvd_{AMVR} - r\,(mvp)$ $$mv_{MVR} = \begin{cases} r(mv) + \beta, & CF < -\alpha \\ r(mv), & -\alpha \le CF < \alpha \\ r(mv) - \beta, & \alpha \le CF \end{cases} \quad \text{[equation 1]}$$

That is, mvMVR may be determined based on a comparison between a complexity factor (CF) value and α. In this connection, α is the threshold for MVR. β is an offset value used to allow $mv_{MVR}$ to be expressed on a fractional sample basis. β may represent, for example, any one of values of ¼ to ¾. In this case, the above equation may be applied to each of the x component and the y component of the motion vector.

For example, in this connection, at least one of α and β may be a predetermined value. In this case, α and β may be determined based on a quantization parameter (QP), coding mode, block size, as shown in the following equation. In this connection, the block size may indicate the size of the predicted block or the size of the coding block including the predicted block when the current block is considered as a predicted block.

$$\alpha = g(QP, mode, size)$$

$$\beta = h(QP, mode, size) \quad \text{[equation 2]}$$

In this connection, functions g( ), and h( ) may be derived by approximating the experimentally obtained optimal value.

As another example, at least one of α and β may be determined by an encoder and transmitted in a slice, picture or sequence unit. For example, the index for the β value may be expressed as:

TABLE 5

| Index | β |
|---|---|
| 0 | 0 |
| 1 | ¼ |
| 2 | 2/4 |
| 3 | ¾ |

Meanwhile, CF is a complexity factor for MVR and may be obtained based on the following equation:

$$CF = r(mv) - mvp \quad \text{[equation 3]}$$

That is, CF may be set as a value=(r(mv) with an integer sample unit for the current block)−(mvp in a fractional sample unit). Since qualitatively, the MV has a very high spatial correlation, the MV of the current block and the MV of neighboring blocks tend to be similar. The mvp in the fractional sample unit may be obtained from neighboring blocks. Thus, if AMVR is applied, the fractional sample unit of the MV of the current block may be inferred based on the r(mv) of the integer sample and the mvp of the fractional sample unit as obtained from the actual decoder.

Thus, according to the present invention, via AMVR, MVD may be transmitted using small data amount on the integer sample basis. Based on the received MVD of the integer sample unit, the decoder may obtain a more accurate MV of the fractional sample unit via the MVR. In this way, coding efficiency can be increased.

Figure 6:
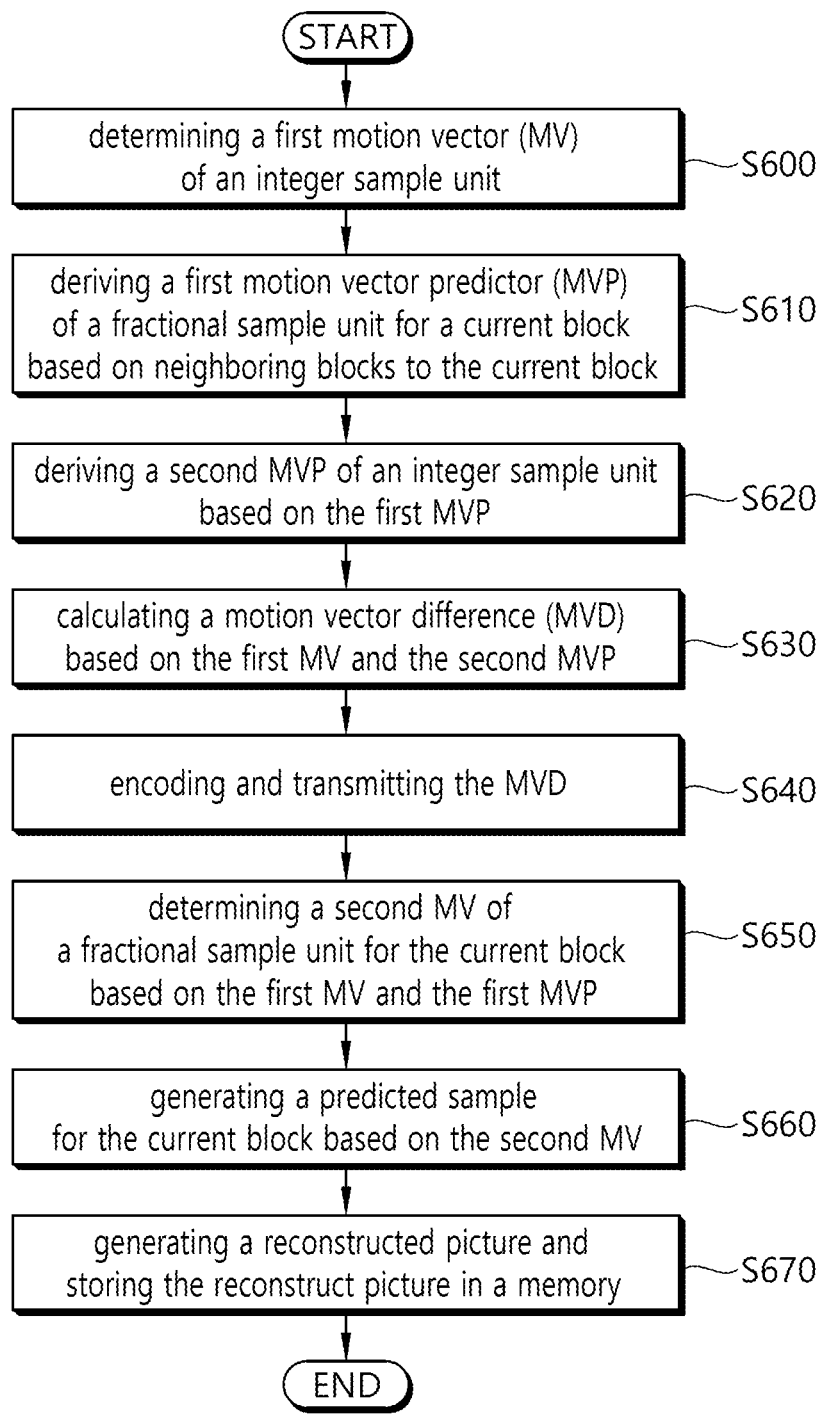
FIG. 6 schematically shows an example of a video encoding method according to the present invention.

FIG. 6 schematically shows an example of a video encoding method according to the present invention. The method described in FIG. 6 may also be performed by an encoder.

Referring to FIG. 6, the encoder determines the first MV of the integer sample unit for the current block based on the motion estimation S600.

For example, the encoder detects the first reference block on the reference picture via motion estimation. The encoder derives the provisional MV of the fractional sample unit based on the positional relationship between the first reference block and the current block. The encoder may round the provisional MV to derive the first MV of the integer sample unit.

As another example, when performing motion estimation, the encoder performs motion estimation on an integer sample basis to detect a second reference block. The encoder may derive the first MV of the integer sample unit based on the position relationship between the second reference block and the current block.

The encoder derives the first MVP of the fractional sample unit based on the neighboring blocks of the current block S610. The encoder may use the MV of the neighboring block as the first MVP of the current block. The encoder may configure the MVP candidate list based on neighboring blocks of the current block. The encoder may select one of the MVP candidate lists to derive the first MVP.

The encoder derives a second MVP of the integer sample unit based on the first MVP S630. The encoder may apply rounding to the first MVP to derive the second MVP of the integer sample unit.

The encoder calculates an MVD for the current block based on the first MV and the second MVP in operation S630. The encoder may calculate the MVD of the integer sample unit based on the difference between the first MV of the integer sample unit and the second MVP of the integer sample unit.

The encoder encodes and transmits the MVD in operation S640. That is, the encoder encodes the MVD and transmits information about the MVD. Information about the MVD may be transmitted to the decoder in a bit stream. In this case, the encoder may decompose the MVD into the x-axis component and the y-axis component, and encode and transmit each component.

The encoder determines a second MV of the fractional sample unit based on the first MV and the first MVP S650. The method of generating the second MV of the fractional sample unit is as described above. The encoder calculates CF based on the first MVP and the first MV. The encoder may apply an offset to the first MV based on a comparison between the CF and the threshold to determine the second MV. In this case, the CF may be calculated as the difference between the first MV and the first MVP. The threshold and the offset may be predetermined. Alternatively, information regarding at least one of the threshold and the offset may be determined by the encoder and transmitted to the decoder.

Specifically, for example, the second MV may be determined based on Equation 1. In this case, $mv_{MVR}$ denotes the second MV, r(mv) denotes the first MV, α denotes the threshold value, and β denotes the offset.

The encoder generates a predicted sample for the current block based on the second MV in operation S660. The encoder obtains a predicted sample value on the reference picture based on the second MV. Thereby, the encoder may generate the predicted sample.

The encoder generates a reconstructed picture based on the predicted sample and the residual sample. The encoder stores the generated reconstruct picture in a memory (S670). Information about the residual sample for the current block may be encoded and transmitted to the decoder. The stored reconstructed picture may be used as a reference picture for inter prediction of another picture.

Meanwhile, although not shown in FIG. 6, the encoder may generate a first flag indicating AMVR availability for the current block and transmit the first flag to the decoder. Further, the encoder may generate a second flag indicating MVR availability for the current block and transmit the second flag to the decoder. The second flag may be transmitted when the value of the first flag is 1. When the value of the second flag is 1, the encoder may generate the predicted sample based on the second MV of the fractional sample unit derived based on the MVR procedure.

FIG. 7 schematically shows an example of the inter prediction method according to the present invention. The method described in FIG. 7 may also be performed by a decoder.

Referring to FIG. 7, the decoder receives information about MVD of the integer sample unit. The decoder may receive information about the MVD in a bit stream. The decoder may receive information about the MVD via entropy decoding. In this case, the decoder may receive information about the x and y axis components of the MVD using different syntax elements.

The decoder derives a first MVP of a fractional sample unit for the current block based on neighboring blocks of the current block S710. The decoder may use the MV of the neighboring blocks as the first MVP of the current block. The decoder may construct an MVP candidate list based on neighboring blocks of the current block. The decoder may select one from the MVP candidate list to derive the first MVP.

The decoder derives the second MVP of the integer sample unit based on the first MVP S720. The decoder may round the first MVP to derive the second MVP of the integer sample unit.

The decoder determines a first MV of an integer sample unit for the current block based on the second MVP and the MVD in operation S730. The decoder may generate the first MV of the integer sample unit by summing the second MVP of the integer sample unit and the MVD of the integer sample unit.

The decoder determines a second MV of a fractional sample unit for the current block based on the first MVP and the first MV S740. The method of generating the second MV of the fractional sample unit is as described above. The decoder calculates CF based on the first MVP and the first MV. The decoder may apply an offset to the first MV based on a comparison between the CF and the threshold to determine the second MV. In this case, the CF may be calculated as a difference value between the first MV and the first MVP. The threshold and the offset may be predetermined. Alternatively, information regarding at least one of the threshold and the offset may be received from the encoder.

Specifically, for example, the second MV may be determined based on Equation 1. In this case, $mv_{MVR}$ denotes the second MV, r(mv) denotes the first MV, α denotes the threshold value, and β denotes the offset.

The decoder generates a predicted sample for the current block based on the second MV at step S750. The decoder derives a reference block on the reference picture based on the second MV. The decoder may generate the predicted sample based on the reference block. The decoder may further receive a residual signal for the current block. The decoder may generate a reconstructed picture based on the predicted sample and the residual signal.

On the other hand, although not shown in FIG. 7, the decoder may further receive a first flag indicating AMVR availability for the current block. Further, the decoder may further receive a second flag indicating MVR availability for the current block. The second flag may be received and obtained when the value of the first flag is 1. If the value of the second flag is 1, the decoder may generate the predicted sample based on the second MV of the fractional sample unit derived based on the MVR procedure.

According to the present invention, it is possible to increase the accuracy of MV while reducing the amount of data allocated to MVD. Further, according to the present invention, the efficiency of inter prediction is improved, and the overall coding efficiency may be increased.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An inter prediction method performed by a decoder, the method comprising:
   receiving information about a motion vector difference (MVD) of an integer sample unit;
   deriving a first motion vector predictor (MVP) of a fractional sample unit for a current block based on neighboring blocks to the current block;
   deriving a second MVP of an integer sample unit based on the first MVP;
   determining a first motion vector (MV) of an integer sample unit for the current block based on the second MVP and the MVD;
   determining a second MV of a fractional sample unit for the current block based on the first MVP and the first MV; and
   generating a predicted sample for the current block based on the second MV,
   wherein determining the second MV comprises:
      calculating a complexity factor (CF) based on the first MVP and the first MV; and applying an offset to the first MV based on a comparison between the CF and a threshold to determine the second MV.

2. The method of claim 1, wherein the second MV is determined based on a following equation:

$$mv_{MVR} = \begin{cases} r(mv) + \beta, & CF < -\alpha \\ r(mv), & -\alpha \leq CF < \alpha \\ r(mv) - \beta, & \alpha \leq CF \end{cases}$$

where $mv_{MVR}$ denotes the second MV, r(mv) denotes the first MV, $\alpha$ denotes the threshold value, and $\beta$ denotes the offset.

3. The method of claim 1, wherein the CF is calculated as a difference between the first MV and the first MVP.

4. The method of claim 1, wherein the threshold and the offset are predetermined.

5. The method of claim 1, wherein information regarding at least one of the threshold and the offset is received from an encoder.

6. The method of claim 1, wherein the offset is determined based on a following table:

| Index | $\beta$ |
|---|---|
| 0 | 0 |
| 1 | 1/4 |
| 2 | 2/4 |
| 3 | 3/4 | where the Index represents a value of information about the offset, and $\beta$ denotes the offset.

7. The method of claim 1, wherein the second MVP is derived by applying rounding to the first MVP.

8. The method of claim 1, further comprising receiving a first flag indicating adaptive motion vector resolution (AMVR) availability for the current block.

9. The method of claim 8, further comprising receiving a second flag indicating motion vector refinement (MVR) availability for the current block,
wherein the second flag is received when a value of the first flag is 1.

10. The method of claim 9, wherein when a value of the second flag is 1, the predicted sample for the current block is generated based on the second MV.

11. The method of claim 1, further comprising:
receiving a residual signal for the current block; and
generating a reconstructed picture based on the predicted sample and the residual signal.

12. A video encoding method performed by an encoder, the method comprising:
determining a first motion vector (MV) of an integer sample unit based on motion estimation;
deriving a first motion vector predictor (MVP) of a fractional sample unit for a current block based on neighboring blocks to the current block;
deriving a second MVP of an integer sample unit based on the first MVP;
calculating a motion vector difference (MVD) based on the first MV and the second MVP;
encoding and transmitting the MVD;
determining a second MV of a fractional sample unit for the current block based on the first MV and the first MVP;
generating a predicted sample for the current block based on the second MV;
generating a reconstructed picture based on the predicted sample and a residual sample for the current block; and
storing the reconstruct picture in a memory,
wherein determining the second MV comprises:
calculating a complexity factor (CF) based on the first MVP and the first MV; and
applying an offset to the first MV based on a comparison between the CF and a threshold to determine the second MV.

13. The method of claim 12, wherein the second MV is determined based on a following equation:

$$mv_{MVR} = \begin{cases} r(mv) + \beta, & CF < -\alpha \\ r(mv), & -\alpha \leq CF < \alpha \\ r(mv) - \beta, & \alpha \leq CF \end{cases}$$

where $mv_{MVR}$ denotes the second MV, r(mv) denotes the first MV, $\alpha$ denotes the threshold value, and $\beta$ denotes the offset.

14. The method of claim 12, wherein the CF is calculated as a difference between the first MV and the first MVP.

15. The method of claim 12, wherein the threshold and the offset are predetermined.

16. The method of claim 12, wherein the second MVP is derived by applying rounding to the first MVP.

17. The method of claim 12, further comprising receiving a first flag indicating adaptive motion vector resolution (AMVR) availability for the current block.

18. The method of claim 17, further comprising receiving a second flag indicating motion vector refinement (MVR) availability for the current block,
wherein the second flag is received when a value of the first flag is 1.

19. The method of claim 18, wherein when a value of the second flag is 1, the predicted sample for the current block is generated based on the second MV.

* * * * *